Dec. 3, 1963   A. M. PLATT   3,112,640
CHROMATOGRAPHIC ANALYSIS
Filed Feb. 15, 1960   2 Sheets-Sheet 1

INVENTOR.
A. M. PLATT
BY
Hudson & Young
ATTORNEYS

Dec. 3, 1963  A. M. PLATT  3,112,640
CHROMATOGRAPHIC ANALYSIS
Filed Feb. 15, 1960  2 Sheets-Sheet 2

INVENTOR.
A. M. PLATT
BY
Hudson & Young
ATTORNEYS

United States Patent Office 3,112,640
Patented Dec. 3, 1963

3,112,640
CHROMATOGRAPHIC ANALYSIS
Albert M. Platt, Borger, Tex., assignor to Phillips Petroleum Company, a corporation of Delaware
Filed Feb. 15, 1960, Ser. No. 8,552
9 Claims. (Cl. 73—23)

This invention relates to the analysis of fluid samples.

In various industrial and laboratory operations, there is a need for analytical procedures which are capable of measuring small concentrations of constituents of fluid mixtures. One analytical procedure which presently is becoming quite valuable for fluid analysis involves elution chromatography. In elution chromatography, a sample of the material to be analyzed is introduced into a column which contains a selective sorbent. A carrier gas is directed through the column so as to force the constituents of the sample through the column. The sorbent attempts to hold the constituents of the sample, whereas the carrier gas tends to push the constituents through the column. This results in the several constituents of the fluid sample traveling through a column at different rates of speed, depending upon their affinities for the packing material. The individual constituents of the fluid sample thus appear in the effluent from the column in sequence. It is common practice to detect these constituents by means of a thermal conductivity analyzer which compares the thermal conductivity of the effluent gas with the thermal conductivity of the carrier gas introduced into the column. Since the thermal conductivities of the various constituents of fluid mixtures often differ considerably, the output signals from the analyzer are often of substantially different magnitude for the different constituents. This reduces the sensitivity of the analyzer because the output signal must be attenuated so that all of the constituents can be detected on the meter or recorder. Various types of adjustable signal attenuators have been employed so that signals representative of the different constituents are attenuated different amounts to provide more recorder sensitivity. However, this does not result in direct readings of the concentration of the constituents because the attenuation factors must be considered.

In accordance with the present invention, a novel analysis procedure is provided whereby the sensitivity of a chromatographic analyzer is increased substantially. A first signal is established which corresponds to the output signal of the analyzer when a standard mixture of predetermined composition is supplied to the analyzer. This first signal is then subtracted from a second signal which corresponds to the analysis of a sample material so that any difference therebetween is measured. It is evident that such a difference can be determined with considerably more accuracy than can an absolute measurement alone. The resulting signal is zero as long as the sample has the same composition as the standard mixture. Only differences between the compositions are recorded as positive or negative signals. The sensitivity of the recorder is thus increased substantially.

Accordingly, it is an object of this invention to provide an improved chromatographic analyzer.

Another object is to provide a method of analyzing fluid samples which utilizes principles of elution chromatography.

A further object is to provide a method of comparing the composition of a fluid sample with a standard mixture of predetermined composition.

Other objects, advantages and features of this invention should become apparent from the following detailed description, taken in conjunction with the accompanying drawing in which.

Figure 1:
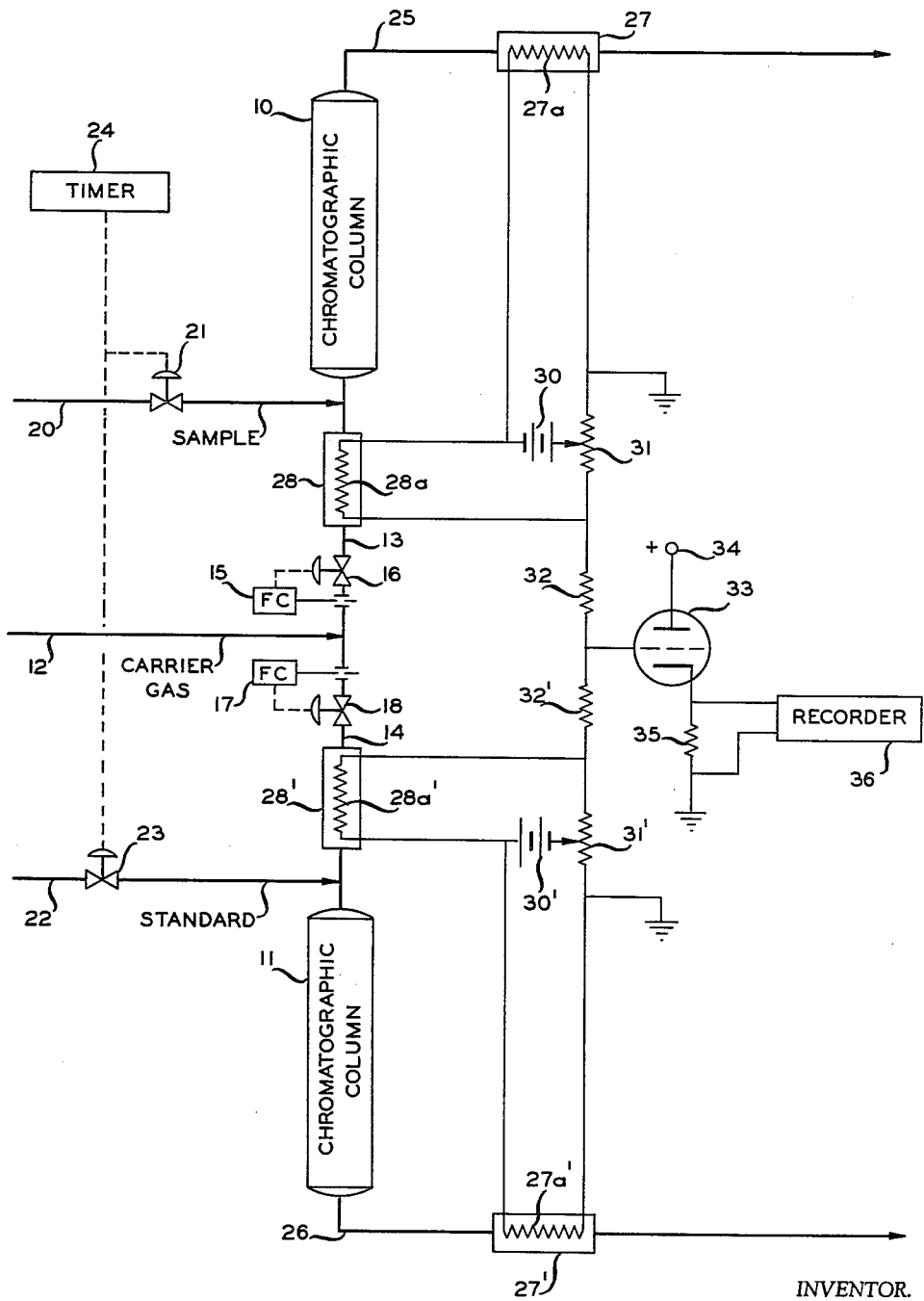
FIGURE 1 is a schematic representation of a first embodiment of the analyzer of this invention.

Referring now to the drawing in detail and to FIGURE 1 in particular, there is shown a pair of chromatographic columns 10 and 11. These columns can be filled with any type of material known in the art which selectively retards passage therethrough of the individual constituents of a fluid mixture. Various types of solid adsorbents and liquid absorbents dispersed on inert solids are known for this purpose. A carrier gas is introduced into the system through a conduit 12 which communicates with the inlets of columns 10 and 11 through respective conduits 13 and 14. A flow controller 15 adjusts a valve 16 in conduit 13 so that the flow of carrier gas into column 11 is maintained constant at a predetermined rate. Similarly, a flow controller 17 adjusts a valve 18 in conduit 14 so that the flow therethrough is also maintained constant, preferably at the same rate at which carrier gas is supplied to column 10. A fluid sample to be analyzed is introduced through a conduit 20 which has a control valve 21 therein. Conduit 20 communicates with conduit 13 near the inlet of column 10. A standard fluid mixture of predetermined composition is introduced through a conduit 22 which has a control valve 23 therein. Conduit 22 communicates with conduit 14 near the inlet of column 11. The effluents from columns 10 and 11 are removed through respective conduits 25 and 26.

The composition of effluent removed from conduit 25 is compared with the composition of the carrier gas introduced through conduit 13. This is accomplished by inserting detector cells 27 and 28 in respective conduits 25 and 13. Cells 27 and 28 contain respective temperature sensitive resistance elements 27a and 28a which are positioned so as to be in thermal contact with the fluids flowing through the respective conduits. First terminals of resistance elements 27a and 28a are connected to one another and to the negative terminal of a current source 30. The second terminals of resistance elements 27a and 28a are connected to the respective end terminals of a potentiometer 31. The contactor of potentiometer 31 is connected to the positive terminal of current source 30. One end terminal of potentiometer 31 is connected to ground, and the second end terminal is connected through a resistor 32 to the control grid of a triode 33.

The circuit elements thus far described form a Wheatstone bridge network which compares the resistance of element 27a with the resistance of element 28a. This comparison is representative of the ratio of the thermal conductivities of the gases flowing through respective conduits 25 and 13. The bridge network can be adjusted initially by movement of the contactor of potentiometer 31. Any change in the ratio of the thermal conductivities results in a change in potential applied through resistor 32 to the control grid of triode 33.

Similar detector cells 27' and 28' are disposed in respective conduits 26 and 14. These detector cells contain resistance elements which are connected in a Wheatstone bridge network that is substantially identical to the one previously described and wherein corresponding elements are designated by like primed reference numerals. It should be noted, however, that the polarity of current source 30' is reversed from the polarity of current source 30.

The anode of triode 33 is connected to a terminal 34 which is maintained at a positive potential. The cathode of triode 33 is connected to ground through a resistor 35. A recorder 36 is connected across resistor 35. Triode 33 thus operates as a cathode follower summing amplifier. The two signals from the Wheatstone bridge networks are added and the resulting sum is applied to recorder 36.

In operation, a fluid sample to be analyzed is introduced into the system through conduit 20. A standard fluid mixture of predetermined composition which appoximates the composition of the fluid sample in introduced through conduit 22. Valves 21 and 23 are opened for a short period of time by means of timer 24 so that predetermined volumes of the sample and standard are introduced into respective columns 10 and 11. Various types of sample valves are known in the art for introducing predetermined volumes of samples into chromatographic analyzers in this manner. If the sample has exactly the same composition as the standard mixture, the output signals of the two bridge networks are equal and of opposite polarity due to the fact that current sources 30 and 30' are reversed. This results in a zero signal being applied to recorder 36. However, any difference between the compositions of the two fluids results in either a positive or a negative signal being applied to recorder 36, depending upon which bridge output signal is of greater magnitude. Any departure in composition of the sample fluid from the standard reference fluid is thus detected by the signal applied to recorder 36.

Figure 2:
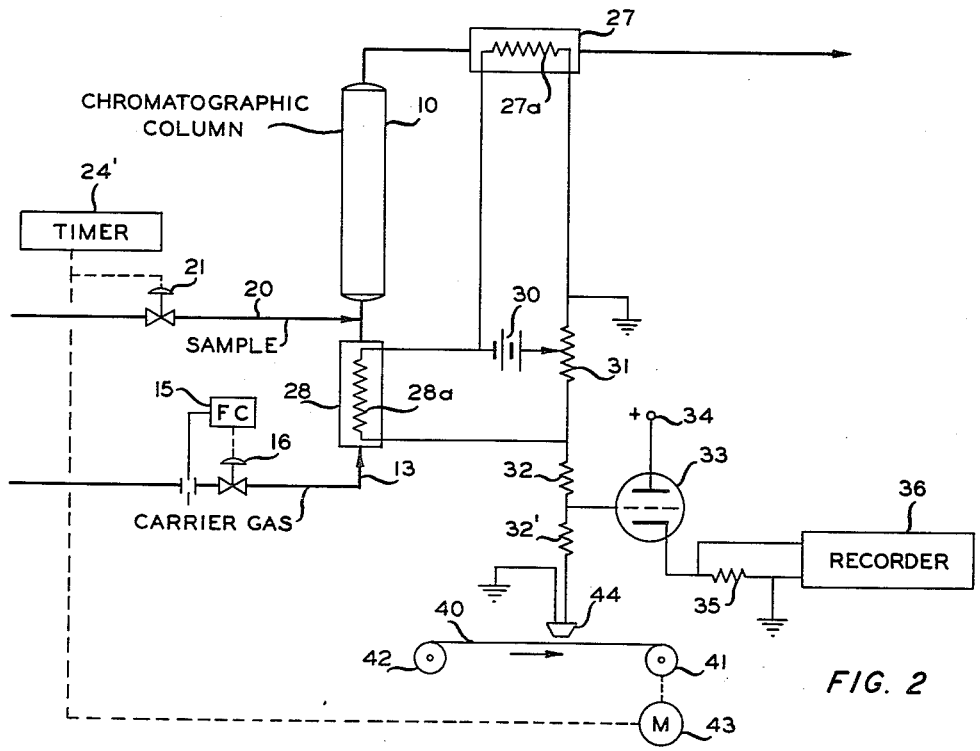
FIGURE 2 is a schematic representation of a second embodiment of the analyzer of this invention.

A second embodiment of the analyzer of this invention is illustrated in FIGURE 2. Conduit 10 and the elements associated therewith are identical to the corresponding elements in FIGURE 1 and are indicated by the corresponding reference numerals. The analyzer of FIGURE 2 employs only a single chromatographic column. A standard fluid of predetermined composition is first introduced through conduit 20, and the output signal from the bridge network is applied to recorder 36. This establishes a conventional chromatographic analysis record of the constituents of the standard fluid mixture. Recorder 36 provides a signal on a recording medium which can subsequently be reproduced. A conventional magnetic tape recorder can be employed to advantage for this purpose. The resulting record on a tape 40, for example, extends between drums 41 and 42, the former being rotated by a motor 43 to move tape 40 past a reproducing head 44. Rotation of motor 43 is controlled by a timer 24' which also controls the opening of valve 21. One terminal of reproducing head 44 is connected through a resistor 32' to the control grid of triode 33. The second terminal of reproducing head 44 is connected to ground.

After the record of the standard fluid analysis is established on tape 40, a sample fluid to be analyzed is introduced through conduit 20. Timer 24' opens valve 21 to admit a predetermined volume of this fluid mixture and at the same time, or a selected later time, starts rotation of motor 43. Motor 43 and tape 40 are adjusted relative to reproducing head 44 so that the signal which is reproduced is 180° out of phase with the signal established by the bridge network which includes resistance elements 27a and 28a. The operation of the analyzer of FIGURE 2 is thus identical to that of the analyzer of FIGURE 1 except that a previously recorded analysis of a standard mixture is substituted for an analysis of a standard mixture made at the same time. The analyzer of FIGURE 2 has certain advantages because only a single standard analysis is required for a plurality of similar sample analyses.

Figure 3:
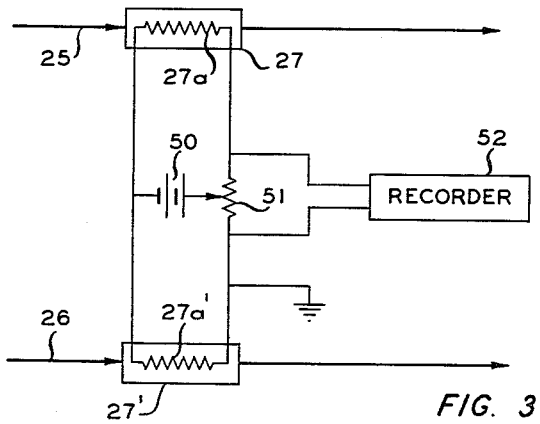
FIGURE 3 is a schematic view of a modified form of the analyzer of FIGURE 1.

A simplified embodiment of the analyzer of FIGURE 1 is illustrated schematically in FIGURE 3. Only a single bridge network is required. The first terminals of resistance elements 27a and 27a' are connected to one terminal of a current source 50. The second terminals of resistance elements 27a and 27a' are connected to the respective end terminals of a potentiometer 51. The contactor of potentiometer 51 is connected to the second terminal of current source 50. A recorder 52 is connected across potentiometer 51. In this embodiment, the thermal conductivities of the effluents from the two columns are compared directly. Since the same carrier gas is introduced into both columns at the same rate, the direct comparison of the column effluents provides an indication of differences therebetween. This difference is measured by the bridge network and applied to recorder 52.

As an example of the operation of the analyzer of this invention, reference is made to the analysis of a fluid mixture comprising 97% cyclohexane, and 1% each of methylcyclopentane, 2-methylpentane and normal heptane, all values being on a mol basis. The reference fluid is a mixture of 98% cyclohexane and 2% normal pentane. The chromatographic column, or columns if two are employed, is 4 meters long and ¼ inch in diameter, and contains a silicone oil deposited on crushed fire brick. Helium forms the carrier gas and flows through the column at a rate of 60 cc./min. Vapor samples of 1 cc. are introduced into the columns. In such an analysis, the individual constituents are eluted at the following times, measured after the sample introduction:

| Constituent: | Time (minutes) |
| --- | --- |
| Normal pentane | 1.8 |
| 2-methylpentane | 2.7 |
| Methylcyclopentane | 4.5 |
| Cyclohexane | 5.8 |
| Normal heptane | 7.0 |

Figure 4:
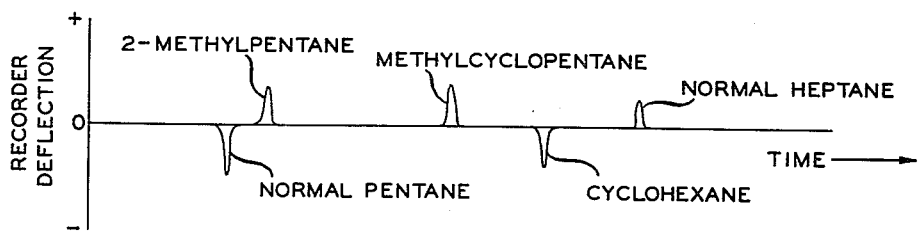
FIGURE 4 is a graphical representation of a typical record produced by the analyzer of this invention.

The resulting analysis is illustrated in FIGURE 4. The normal pentane appears as a negative peak because this constituent appears in the standard and not in the sample. Cyclohexane also appears as a negative peak because it is present in greater concentration in the standard. The remaining constituents are present only in the sample, and thus appear as positive peaks.

In view of the foregoing description, it can be seen that a novel analysis procedure is provided for comparing the composition of a standard fluid mixture with a sample fluid mixture. While the invention has been described in conjunction with present preferred embodiments, it should be evident that it is not limited thereto.

What is claimed is:

1. Analysis apparatus comprising a column filled with a material which selectively retards passage therethrough of the constituents of a fluid mixture, means to introduce a carrier gas into said column, means to introduce a fluid sample to be analyzed into said column to be moved therethrough by said carrier gas, means to establish a first signal representative of the composition of the effluent from said column, means to establish a second signal representative of the effluent from such a column of a fluid mixture analyzed which has a predetermined composition which approximates the composition of said fluid sample, timing means to actuate the reproduction of said second signal simultaneously with the establishment of said first signal, and means to subtract one of said signals from the other to form a third signal, said third signal being representative of differences between the composition of the fluid sample introduced into said column and said fluid mixture of predetermined composition.

2. The apparatus of claim 1 wherein said means to establish a second signal comprises a recording medium to first receive a signal representative of the effluent from such a column of a fluid mixture being analyzed which has a predetermined composition which approximates the composition of said fluid sample, and a reproducing means associated with said recording medium subsequently to establish a signal representative of the signal on said recording medium, said reproduction means being actuated by said timing means when said fluid sample is moving through said column.

3. Analysis apparatus comprising a first column filled with a material which selectively retards passage therethrough of the constituents of a fluid mixture, means to introduce a carrier gas into said first column, means to introduce a fluid sample to be analyzed into said first column to be moved therethrough by said carrier gas, means to establish a first signal representative of the composition of the effluent from said first column, a second column filled with a material which selectively retards passage therethrough of the constituents of a fluid mixture, means to introduce a carrier gas into said second column, means to introduce a fluid mixture of predetermined composition which approximates the composition of said fluid sample into said second column to be moved therethrough by said carrier gas, means to establish a second signal representative of the composition of the effluent from said second column, timing means to actuate the reproduction of said second signal simultaneously with the establishment of said first signal, and means to subtract one of said signals from the other to form a third signal, said third signal being representative of differences between the composition of said fluid mixture and said fluid sample.

4. The apparatus of claim 3 wherein said means to establish said first signal comprises first and second temperature sensitive resistance elements positioned in thermal contact with the carrier gas introduced into and the effluent from said first column, respectively, and means to compare the resistances of said first and second elements; and said means to establish said second signal comprises third and fourth temperature sensitive resistance elements positioned in thermal contact with the carrier gas introduced into and the effluent from said second column, respectively, and means to compare the resistances of said third and fourth elements.

5. The apparatus of claim 4 wherein said means to establish said signals comprises first and second temperature sensitive resistance elements positioned in thermal contact with the effluents from said first and second columns, respectively, and means to compare the resistances of said first and second elements.

6. The method of analyzing a fluid sample which comprises introducing a fluid mixture of predetermined composition which approximates the composition of said fluid sample into a chromatographic analysis zone, passing a carrier gas through said zone to elute the constituents of said mixture in sequence, measuring and recording a property of the effluent from said zone which is representative of the composition thereof, thereafter introducing a fluid sample into said zone, passing a carrier gas through said zone to elute the constituents of said sample in sequence, measuring a property of the effluent from said zone which is representative of the composition thereof, reproducing said recorded property for comparison with said property of said effluent to obtain the difference therebetween and thus obtaining a value representative of the difference of the composition of the sample from that of the predetermined composition.

7. The method of analyzing a fluid sample which comprises introducing a fluid mixture of predetermined composition which approximates the composition of said fluid sample into a first chromatographic analysis zone, introducing a fluid sample into a second chromatographic analysis zone, simultaneously passing a carrier gas through said first and second zones to elute constituents of said mixture and said sample, respectively, simultaneously comparing properties of the effluents from said two zones which are representative of the compositions thereof to obtain a signal representative of the differences between said effluents and thus obtaining a value representative of the difference of the composition of the sample from that of the predetermined composition.

8. The method of analyzing a fluid sample which comprises introducing a fluid mixture of predetermined composition which approximates the composition of said fluid sample into a first chromatographic analysis zone, passing a carrier gas through said zone to elute the constituents of said mixture in sequence, measuring a property to the effluent from said zone which is representative of the composition thereof, recording the resulting measured property of the effluent, introducing a fluid sample into a chromatographic analysis zone, passing a carrier gas through said zone to elute the constituents of said sample in sequence, measuring a property of the effluent from said chromatographic analysis zone which is representative of the composition thereof, reproducing the recorded property to compare the measured property of said fluid sample with the recorded property of said fluid mixture so as to obtain the difference therebetween, and thus obtaining a value representative of the difference of the composition of the sample from that of the predetermined composition.

9. The method of analyzing a fluid which comprises introducing a fluid mixture of predetermined composition which approximates the composition of said fluid into a first chromatographic analysis zone while at the same time introducing a fluid sample into a second chromatographic analysis zone, passing a carrier gas through each of said first and second chromatographic analysis zones to elute the constituents of said sample and measuring a property of the effluent from each of said first and second chromatographic zones, obtaining a signal from each of said first and second chromatographic zones representative of said property, introducing said signals to a signal summing zone, and obtaining therefrom a signal representative of the difference between said effluents.

References Cited in the file of this patent

UNITED STATES PATENTS

| 2,579,831 | Keinath | Dec. 25, 1951 |
| 2,603,964 | Foley et al. | Jan. 22, 1952 |
| 2,920,478 | Golay | Jan. 12, 1960 |
| 2,949,765 | Thayer et al. | Aug. 23, 1960 |

OTHER REFERENCES

Gas Chromatography, C. Phillips, published by Academic Press Inc., New York, 1956, page 64.

Gas Chromatography, book by D. H. Desty, published in London by Butterworths Scientific Publications in 1958, pp. 142, 152 relied on.